United States Patent
Wendorski et al.

(10) Patent No.: US 10,029,289 B2
(45) Date of Patent: Jul. 24, 2018

(54) VARIABLE-VOLUME EXHAUST SYSTEM

(75) Inventors: Ronald L. Wendorski, Kronenwetter, WI (US); John Enzenroth, Weston, WI (US); Tony Podjaski, Marathon, WI (US); Kyle Rothmeyer, Merrill, WI (US); Bruce Knieriem, Wausau, WI (US); Anthony Rossi, Indianapolis, IN (US)

(73) Assignee: GREENHECK FAN CORPORATION, Schofield, WI (US)

( * ) Notice: Subject to any disclaimer, the term of this patent is extended or adjusted under 35 U.S.C. 154(b) by 1108 days.

(21) Appl. No.: 13/495,767

(22) Filed: Jun. 13, 2012

(65) Prior Publication Data

US 2012/0322358 A1    Dec. 20, 2012

Related U.S. Application Data

(60) Provisional application No. 61/542,614, filed on Oct. 3, 2011, provisional application No. 61/497,152, filed
(Continued)

(51) Int. Cl.
*F24F 11/00* (2018.01)
*B08B 15/00* (2006.01)
(Continued)

(52) U.S. Cl.
CPC ............ *B08B 15/002* (2013.01); *F24F 11/77* (2018.01); *F24F 2007/001* (2013.01); *F24F 2110/40* (2018.01); *Y02B 30/746* (2013.01)

(58) Field of Classification Search
CPC .... F24F 11/0079; F24F 13/0281; F24F 11/04; F24F 7/04; F24F 7/02; F24F 7/06;
(Continued)

(56) References Cited

U.S. PATENT DOCUMENTS 4,095,514 A  *  6/1978  Roy ........................ F23L 17/02
                                                          110/184
5,518,446 A      5/1996  Jacob
(Continued)

FOREIGN PATENT DOCUMENTS

WO    WO2009/091477          7/2009
WO    WO 2009091477 A1  *   7/2009 ........... B08B 15/002

OTHER PUBLICATIONS

PCT International Search Report and Written Opinion for Application No. PCT/US2012/041138 dated Oct. 18, 2012 (11 pages).

*Primary Examiner* — Steven B McAllister
*Assistant Examiner* — Ko-Wei Lin

(57) ABSTRACT

An exhaust system for exhausting air from a space includes a variable-volume exhaust air moving system having at least one fan having an inlet and an outlet. A duct is connected to the inlet and an outlet nozzle defining a variable cross-sectional outlet area is fluidly connected to the outlet. A selectively operable bypass damper is fluidly connected to the inlet. A sensor is located in the exhaust system for detecting at least one of a pressure condition and a flow condition therein. A control system controls the at least one fan, the outlet nozzle, and the bypass damper, based on a signal sent from the sensor.

8 Claims, 19 Drawing Sheets

Related U.S. Application Data on Jun. 15, 2011, provisional application No. 61/496,944, filed on Jun. 14, 2011, provisional application No. 61/496,829, filed on Jun. 14, 2011.

(51) Int. Cl.
*F24F 11/77* (2018.01)
*F24F 7/00* (2006.01)
*F24F 110/40* (2018.01)

(58) Field of Classification Search
CPC ........ F24F 2007/002; F24F 13/26; F24F 1/01; B08B 15/002; F23J 13/02; F23J 2213/10; F03D 1/04; F23L 13/10; F23L 17/12
USPC .. 454/340, 347, 244, 49, 56, 27, 30, 31, 39, 454/41–42, 44, 47
See application file for complete search history.

(56) References Cited

U.S. PATENT DOCUMENTS

| | | |
|---|---|---|
| 5,586,861 A | 12/1996 | Berger |
| 6,071,188 A | 6/2000 | O'Neill et al. |
| 6,302,779 B1 | 10/2001 | Ryan et al. |
| 6,520,848 B1 * | 2/2003 | Grant .................... F23L 13/02 110/184 |
| 6,676,503 B2 * | 1/2004 | Hill ...................... F23L 17/005 454/17 |
| 6,890,252 B2 † | 5/2005 | Liu |
| 2005/0159102 A1 | 7/2005 | Seliger et al. |
| 2007/0202795 A1 | 8/2007 | Seliger et al. |
| 2012/0028562 A1 * | 2/2012 | Heim ................... F16L 55/027 454/255 |

\* cited by examiner
† cited by third party

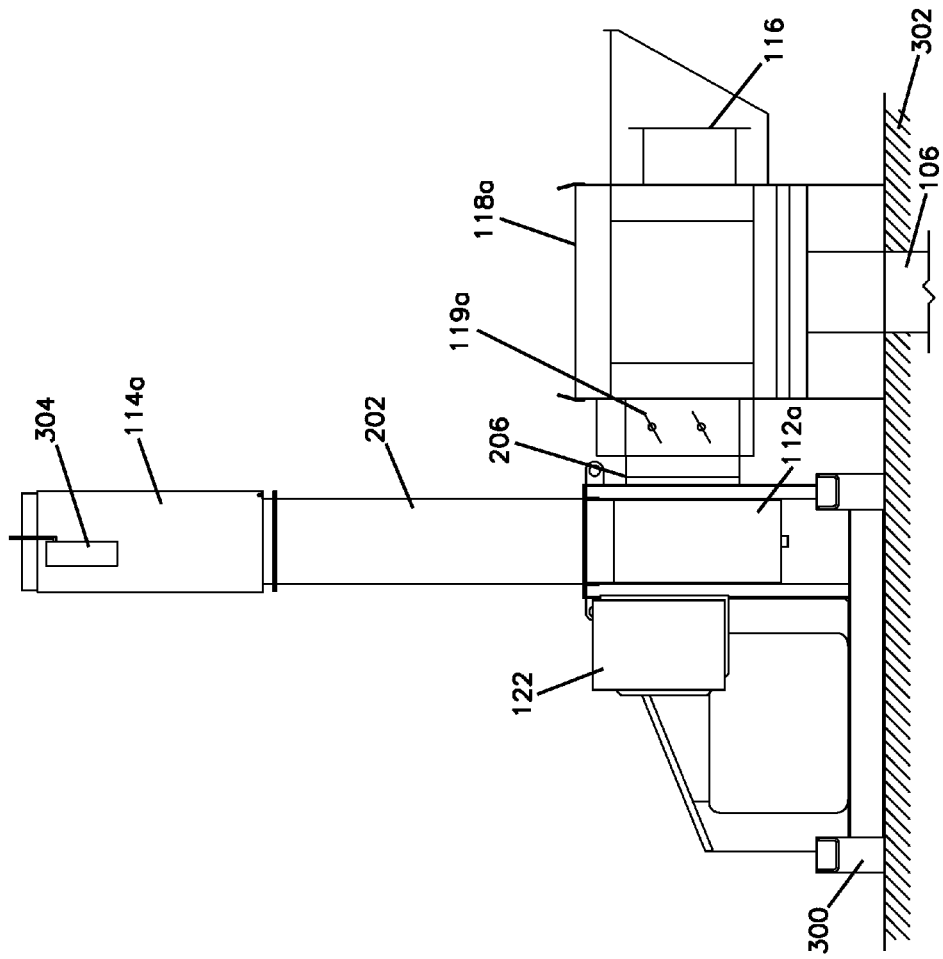
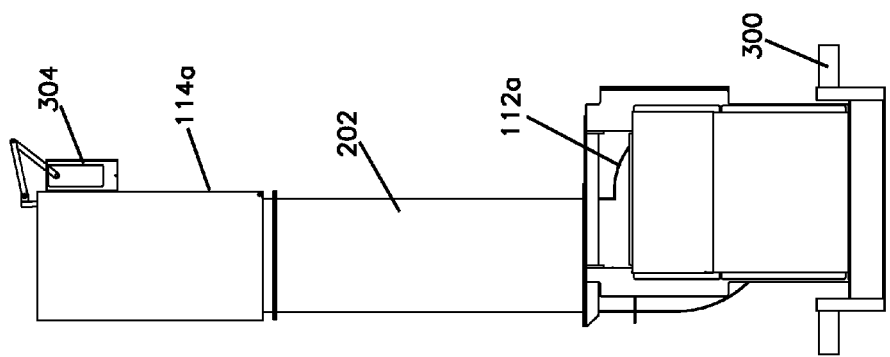

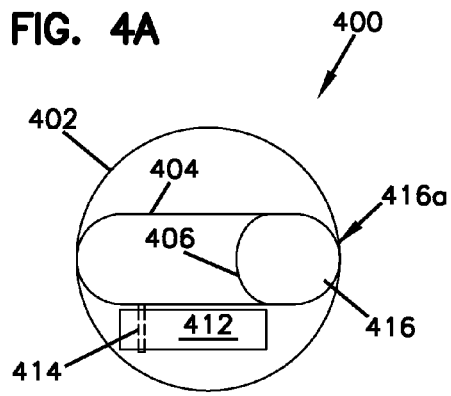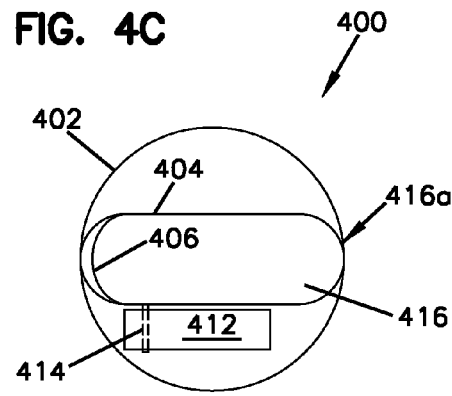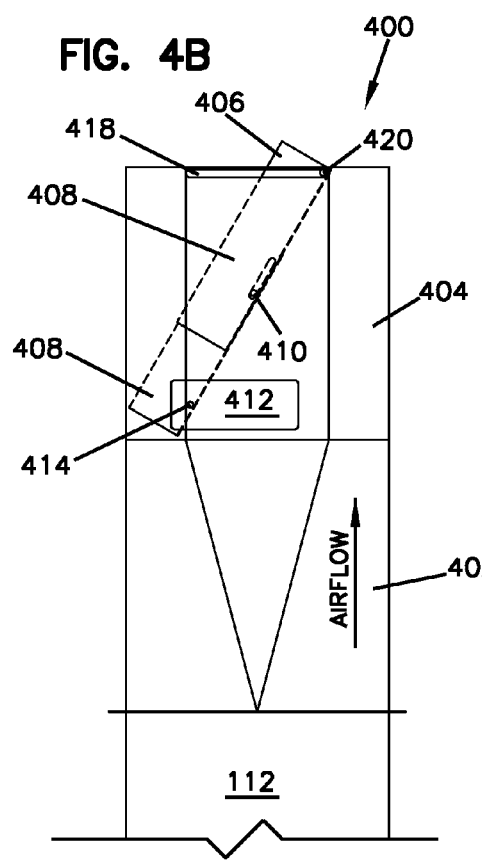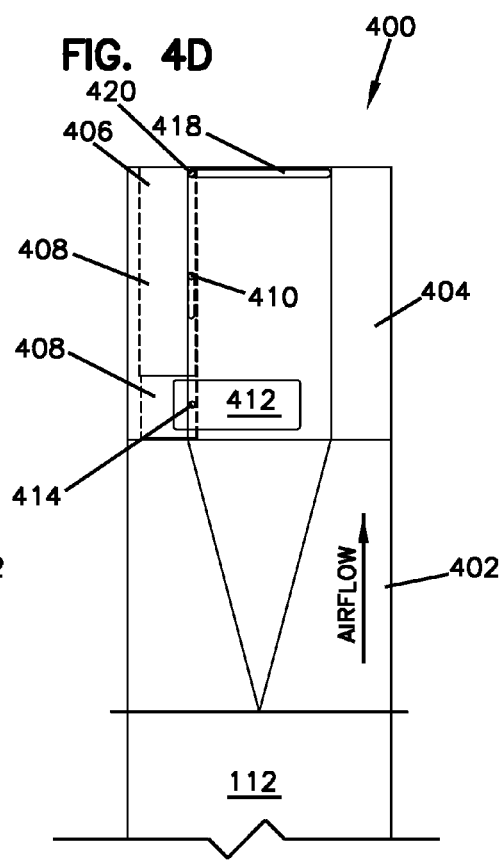

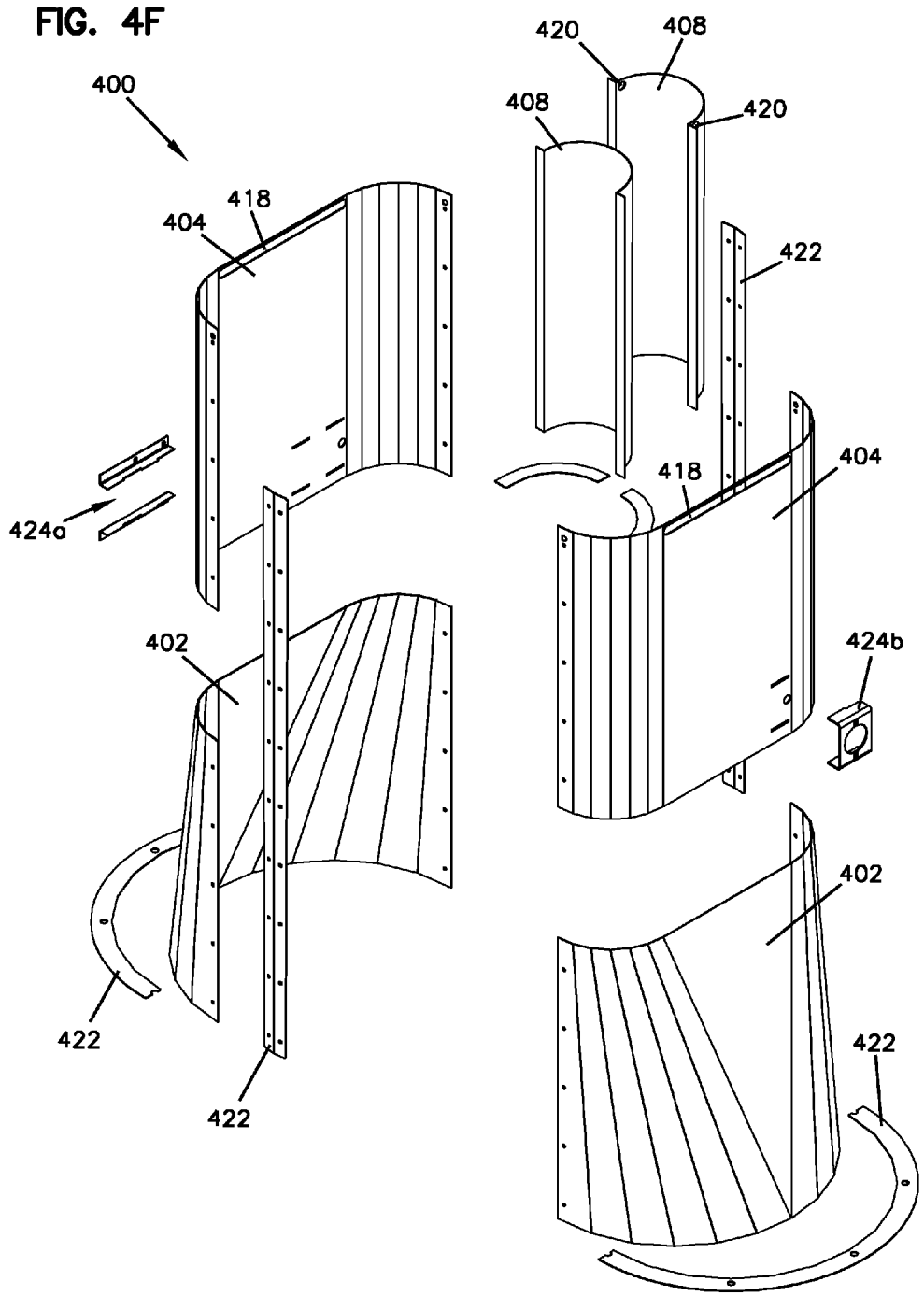

FIG. 5D
FIG. 5F
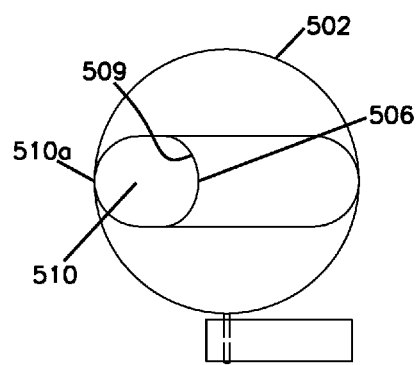
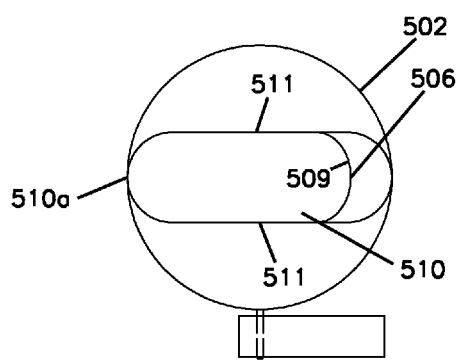
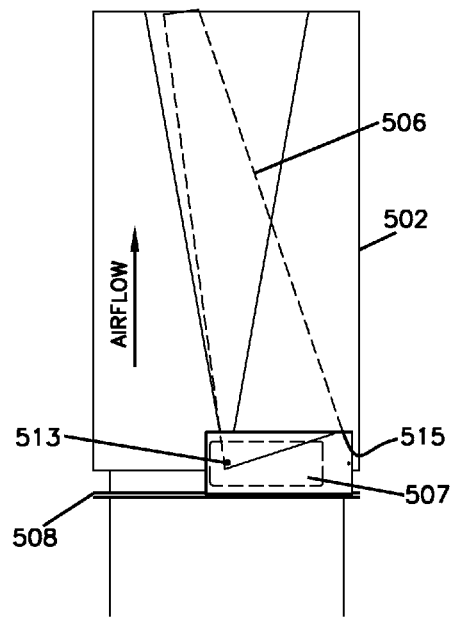
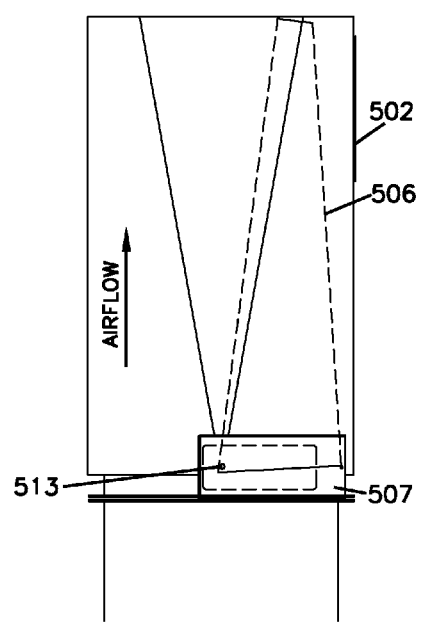
FIG. 5C
FIG. 5E

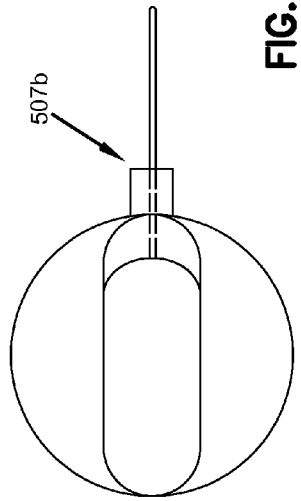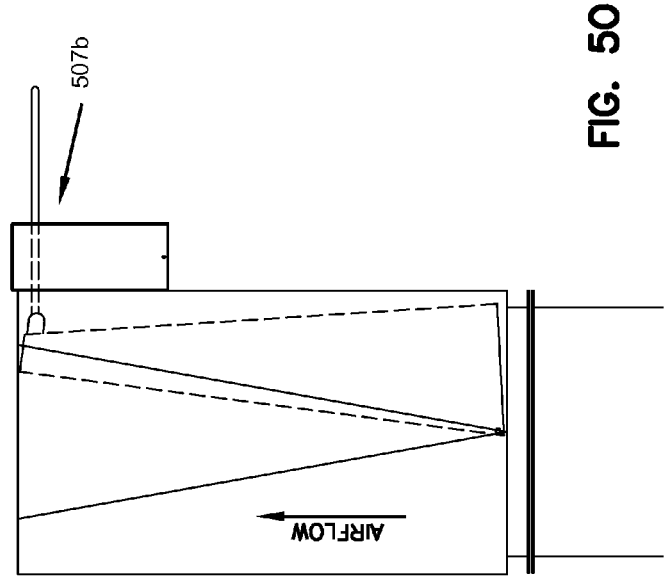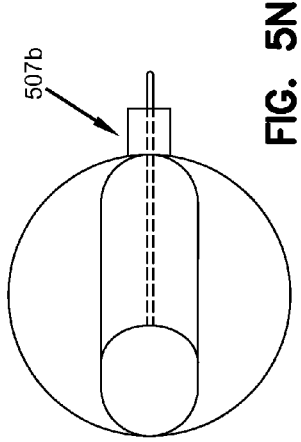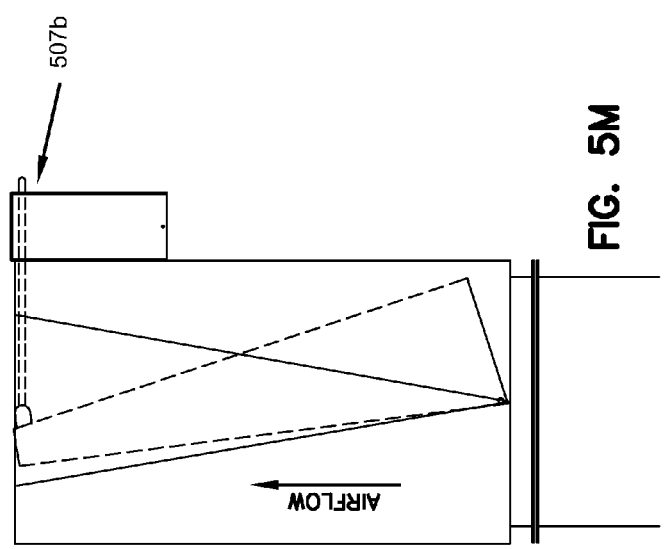

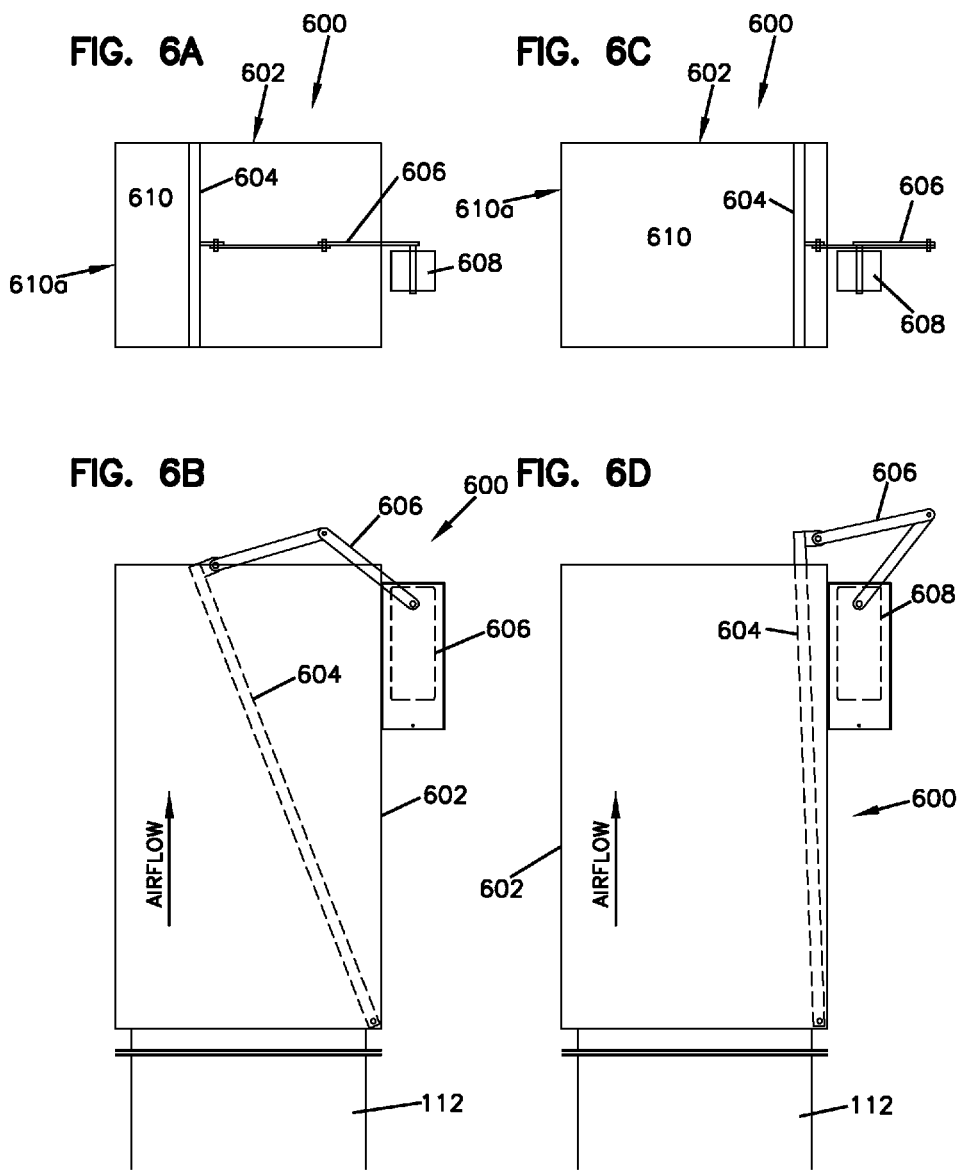

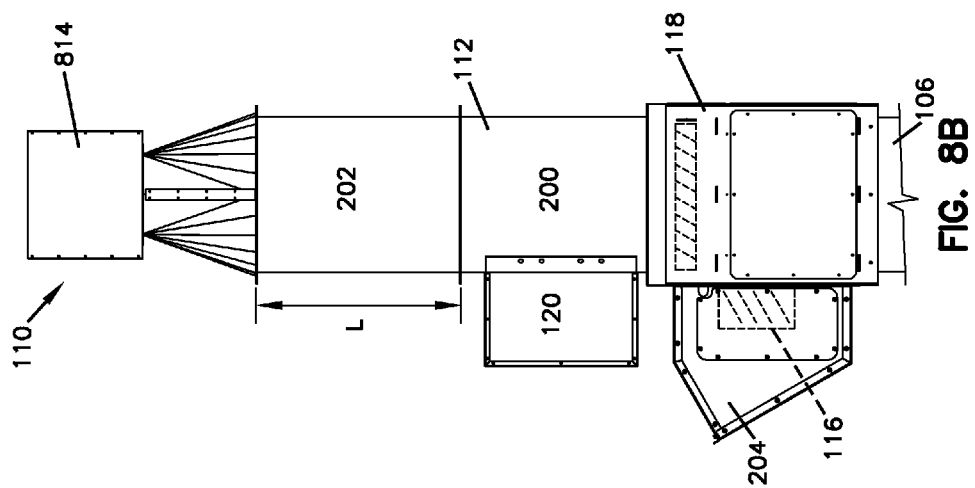
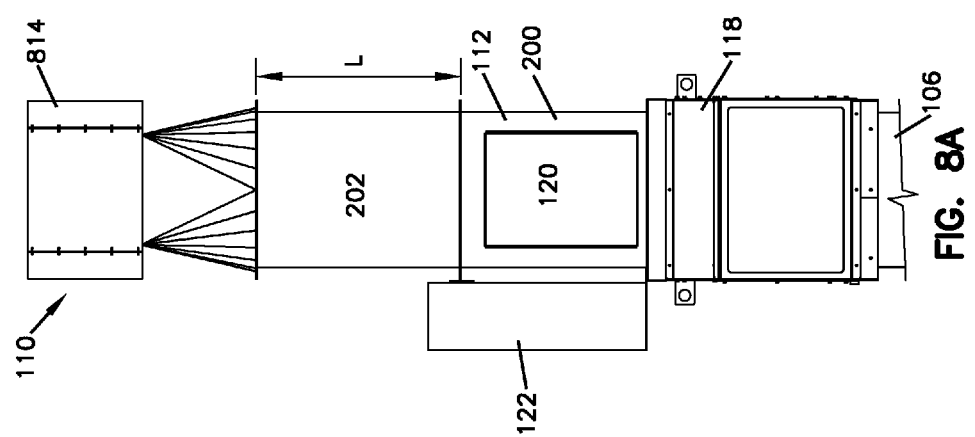

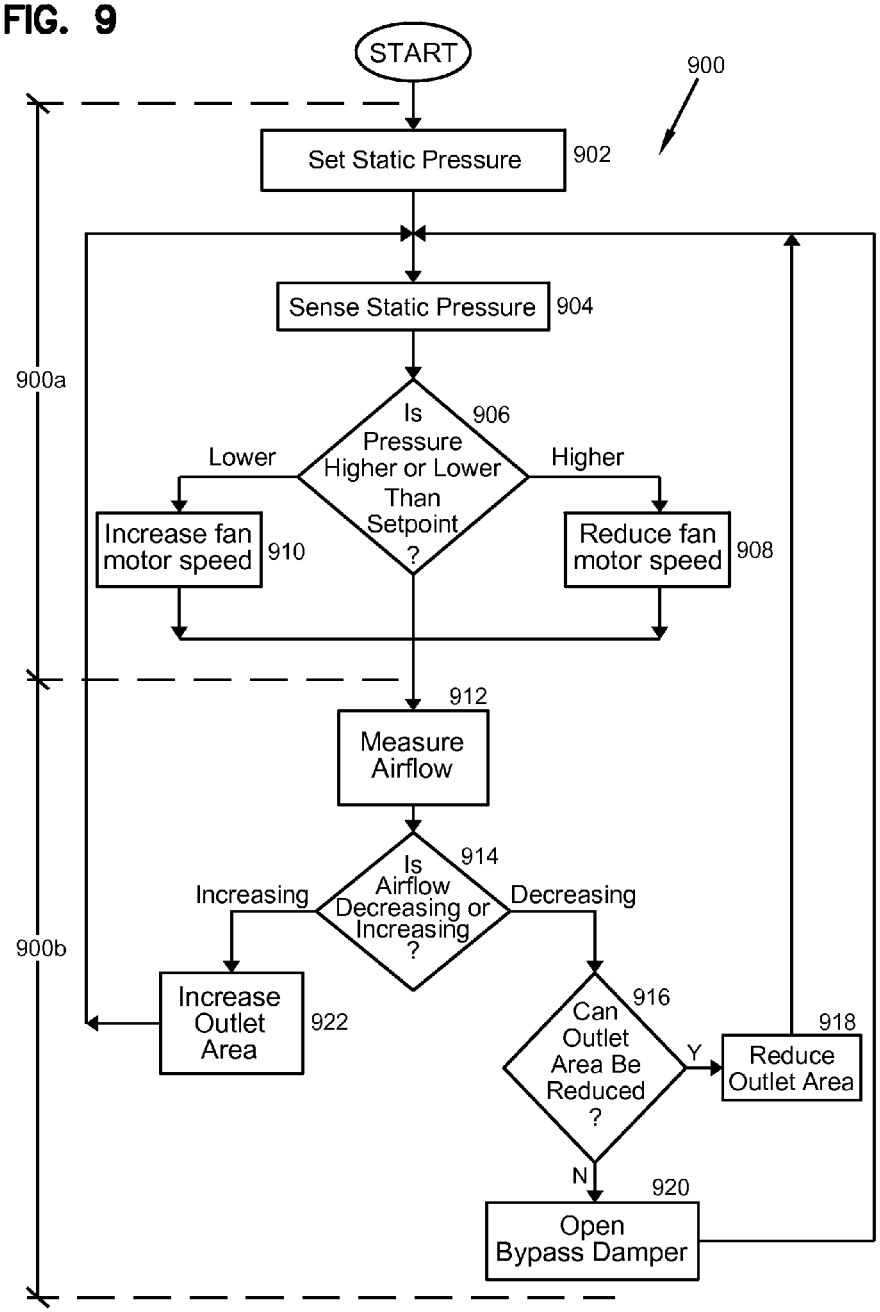

VARIABLE-VOLUME EXHAUST SYSTEM

CROSS-REFERENCE TO RELATED APPLICATIONS

This application claims priority to and the benefit of U.S. Provisional Patent Application No. 61/542,614, filed Oct. 3, 2011, and entitled "Variable-Volume Exhaust System"; U.S. Provisional Patent Application No. 61/497,152, filed Jun. 15, 2011, and entitled "Variable-Volume Exhaust System"; U.S. Provisional Patent Application No. 61/496,944, filed Jun. 14, 2011, and entitled "Variable-Volume Exhaust System"; and U.S. Provisional Patent Application No. 61/496,829, filed Jun. 14, 2011, and entitled "Variable-Volume Exhaust System"; the disclosures of which are hereby incorporated by reference herein in their entireties.

INTRODUCTION

Currently, national, state and local codes, as well as specific project requirements, dictate the minimum velocity allowed to be discharged out of an exhaust fan discharge nozzle for a laboratory hood or other (potentially) contaminated or noxious space. For instance, ANSI Z9.5 (American National Standard—Laboratory Ventilation) currently specifies a minimum discharge velocity of 3000 feet per minute at the exit of a lab exhaust nozzle. Even though the discharge of the nozzle has to remain at or above this specified velocity, there is still a need to vary the exhaust volume of the air in the laboratory space, depending on the configuration of the laboratory exhaust system, supply air to the space, the need to ventilate multiple hoods or spaces, etc. Balanced against this exhaust velocity requirement is the additional need to reduce energy consumed by the exhaust fan system (i.e., lower fan flow rates correspond to lower fan horsepower and reduced electrical energy consumption).

Maintaining a minimum exhaust nozzle discharge velocity helps insure safe dispersion of hazardous, noxious or odiferous exhaust, prevents exhaust stack "down wash" and minimizes the re-entrainment of exhaust effluent into the building or surrounding building's make up air intake systems. Historically, this has been done with either constant volume exhaust systems or variable volume exhaust systems. Constant volume systems maintain a constant volume of air being drawn from the occupied space and through the fan which, in turn, maintains constant flow through the exhaust fan and fan discharge. This technique uses 100% conditioned air to maintain constant air volume. Variable volume systems utilize bypass air dampers above the roof deck or from a ducted outside environment. As exhaust flow requirements reduce the bypass air damper opens, mixing an equal amount of unconditioned air with the reduced exhaust so that the air flow through the exhaust fan remains constant. This method utilizes unconditioned air to maintain constant air volume, however no fan energy savings are realized, as the fan is running at a constant flow rate to maintain constant exhaust fan discharge velocity. Exhaust fans are typically run at constant fan speeds to maintain constant airflow volume. Any lowering of fan speed to reduce fan flow in turn reduces the fan exhaust outlet velocity of the fan that has a fixed outlet area. Concerns of reducing exhaust fan energy consumption in exhaust systems have led to the re-evaluation of continuously varying ventilation requirements for containment in exhaust systems, also known as "demand-based ventilation".

With the desire to reduce fan flow, resulting in reduced fan energy consumption, an exhaust system with a fixed area outlet nozzle would result in reduced discharge velocity and possibility of exhaust stack "down wash" and the re-entrainment of exhaust effluent into make up air intake systems. By applying a variable nozzle that has the ability to adjust the exit area of the fan, the discharge exit velocity of the air can be controlled at varying fan airflow rates and fan speeds. Running fans at lower speeds greatly reduces the power consumption associated with the fan.

SUMMARY

The technology described herein includes systems, equipment, and controls that control a variable cross-sectional outlet area nozzle that is used in conjunction with an exhaust fan (upblast, high plume, radial, axial, induced flow, etc.). The system components include, in one embodiment, a variable speed exhaust fan, a variable cross-sectional outlet area nozzle, a non-invasive peizometric flow monitoring system, a controller, a variable frequency drive, and a bypass air damper. The fan, variable nozzle and flow monitoring system may be incorporated into a single package or may be installed as individual components throughout an exhaust system.

The system may include the nozzle and flow measuring components incorporated into the fan and installed exterior to the building or within a mechanical room with exhaust flowing out of the building. The variable frequency drive may be mounted at the fan or in a convenient remote location such as an electrical or mechanical room. A bypass air plenum and bypass air damper may also be mounted on an inlet side of the exhaust fan. Fume hoods, chemical containment cabinets, or general building exhaust may be tied into the exhaust system. One or more static pressure probes may be mounted in the duct work and connected to pressure transducers. The system may also have valves or dampers operating within the duct work in conjunction with fume hoods or chemical containment cabinets or other zones within a space.

In one aspect, the technology relates to an exhaust system for exhausting air from a space, the exhaust system including: a variable-volume exhaust air moving system including at least one fan including an inlet and an outlet; a duct connected to the inlet; an outlet nozzle having a variable cross-sectional outlet area, the outlet nozzle fluidly connected to the outlet; a selectively operable bypass damper fluidly connected to the inlet; a sensor for detecting at least one of a pressure condition and a flow condition in the exhaust system; and a control system for controlling the at least one fan, the outlet nozzle, and the bypass damper, based at least in part on a signal sent from the sensor. In an embodiment of the exhaust system, the sensor includes a pressure sensor located in the duct; the at least one fan includes a variable speed fan; and the control system modulates a speed of the variable speed fan based at least in part on a signal sent from the sensor to the control system. In another embodiment of exhaust system, the sensor includes a velocity sensor located proximate the outlet nozzle; and the control system modulates the cross-sectional outlet area of the outlet nozzle based at least in part on a signal sent from the sensor to the control system. In yet another embodiment of the exhaust system, the control system: varies a speed of the fan based on a static pressure sensed in the duct; varies the cross-sectional outlet area of the outlet nozzle based on an exhaust air velocity proximate the nozzle; and selectively operates the bypass damper based on a need condition. In still another embodiment, the need condition includes at least one of an override condition, a low air flow condition, and a failure condition.

In another embodiment of the above aspect, the air moving system further includes at least one remote exhaust fan for exhausting air from at least one of a room and an exhaust hood to the duct. In another embodiment, the outlet nozzle includes: an exhaust riser defining a first cross-sectional area; a plurality of dampers positionable within the exhaust riser, wherein a position of the damper defines a second-cross sectional area of the exhaust riser; and at least one actuator for positioning the dampers. In yet another embodiment, the plurality of dampers include a first damper and a second damper, and wherein the at least one actuator includes a first actuator and a second actuator. In still another embodiment the exhaust system includes a nozzle housing, wherein the first damper and the second damper are located within the housing, and wherein the housing defines a separation between the housing and each of the first damper and the second damper.

In another aspect, the technology relates to a variable-volume exhaust air moving system including: at least one fan having an inlet and an outlet; a duct fluidicly connected to the fan inlet; an outlet nozzle having a variable cross-sectional outlet area, the outlet nozzle fluidicly connected to the fan outlet; and a controller for (a) at least one of (i) energizing the fan based on a static pressure sensed in the duct and (ii) modulating a fan speed based solely on a static pressure sensed in the duct, and (b) for controlling the cross-sectional area of the outlet nozzle based solely on an exhaust air velocity proximate the nozzle. In an embodiment, the variable-volume exhaust air moving system further includes a selectively-operable bypass damper, and wherein the controller operates the bypass damper when the cross-sectional outlet area of the outlet nozzle is at a minimum outlet area. In another aspect, the variable-volume exhaust air moving system further includes a selectively-operable bypass damper, and wherein the controller operates the bypass damper based on at least one of an override condition, a low air flow condition, and a failure condition.

In another aspect, the technology relates to an exhaust fan system including: a fan; a fan outlet nozzle; a movable damper located in the nozzle; and a flow-monitoring system for moving the damper based on an exhaust air velocity at the nozzle. In an embodiment, the flow-monitoring system includes a sensor located proximate an inlet of the fan, and wherein the flow-monitoring system calculates the exhaust air velocity at the nozzle based at least in part on an output from the sensor and a rotational speed of the fan.

In another aspect, the technology relates to a method of controlling a variable-volume exhaust system including a fan, a duct connected to the fan, and an outlet nozzle including a variable cross-sectional area, the method including the steps of: (a) at least one of: energizing the fan based on a static pressure sensed in the duct; and controlling a fan speed based solely on a static pressure sensed in the duct; and (b) varying the cross-sectional area of the outlet nozzle based solely on an exhaust air velocity proximate the nozzle.

BRIEF DESCRIPTION OF THE DRAWINGS

There are shown in the drawings, embodiments which are presently preferred, it being understood, however, that the technology is not limited to the precise arrangements and instrumentalities shown.

FIGS. 3A and 3B are front and side views, respectively, of another fan system for a variable-volume exhaust system.

FIGS. 4A-4D are top and side views of a variable cross-sectional outlet area nozzle.

FIGS. 4E and 4F are perspective and exploded perspective views, respectively, of a variable cross-sectional outlet area nozzle.

FIGS. 5C and 5D are side and top views, respectively, showing the nozzle of FIGS. 5A and 5B in a closed position.

FIGS. 5E and 5F are side and top views, respectively, showing the nozzle of FIGS. 5A and 5B in an open position.

FIGS. 5M-5P show the nozzle of FIGS. 5A and 5B with a linear actuator.

FIGS. 6A-6D are top and side views of another variable cross-sectional outlet area nozzle.

FIGS. 8A-8B are front and side views, respectively, of another fan system for a variable-volume exhaust system.

FIG. 9 depicts a method of controlling a variable-volume exhaust system.

DETAILED DESCRIPTION

Figure 1:
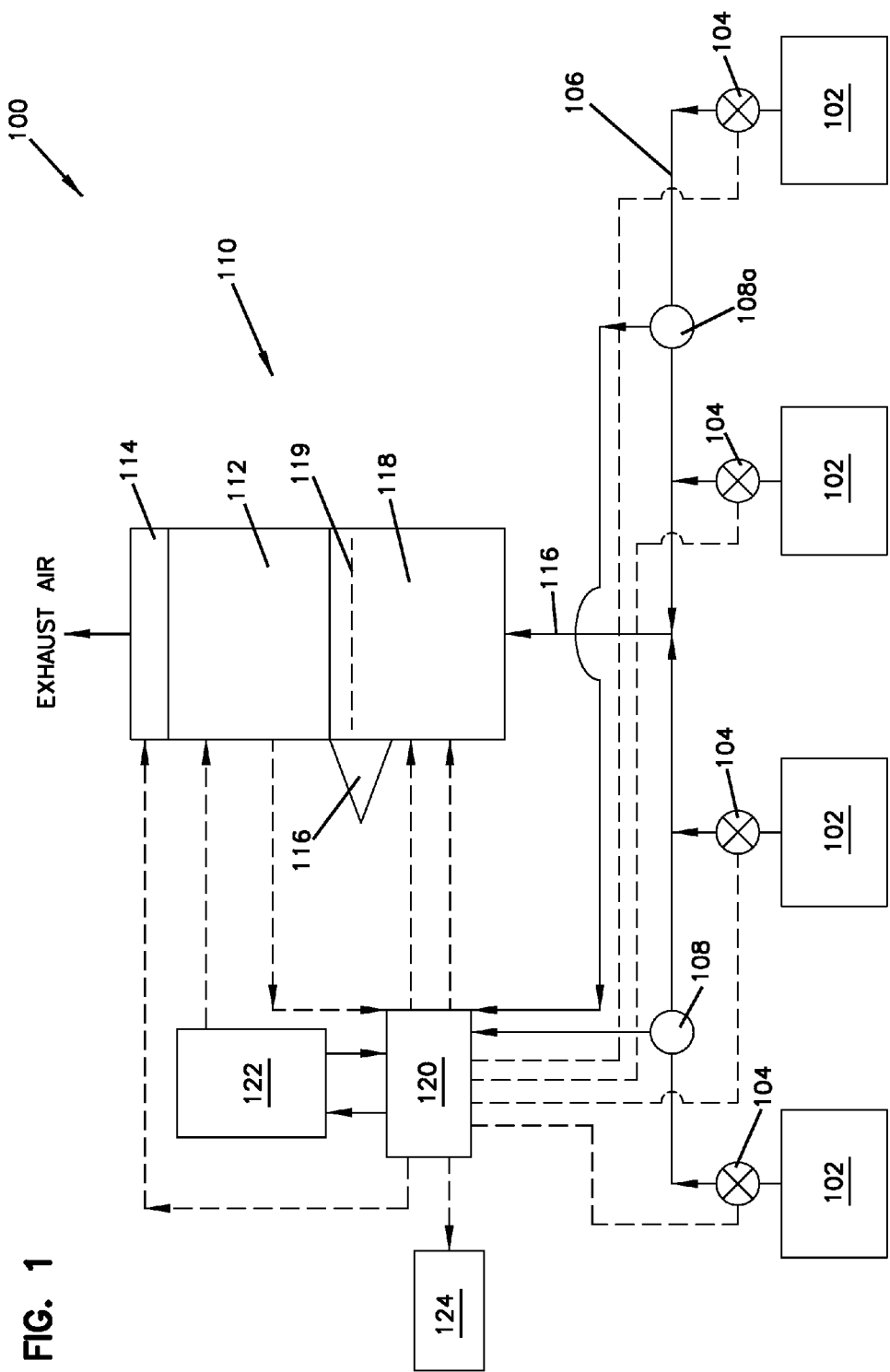
FIG. 1 is a schematic diagram of a variable-volume exhaust system.

FIG. 1 depicts a schematic diagram of a variable-volume exhaust system 100. The system 100 exhausts air from one or more spaces 102, typically fume hoods used in laboratory environments, although other spaces are contemplated, as described below. A valve, damper, or other flow-preventing apparatus 104 is located at an outlet of each space 102, thereby selectively preventing flow when desired. Each damper 104 is connected to a duct 106, which may be in a header or other configuration. Located in the duct 106 is at least one static pressure sensor monitor 108. Additional static pressure sensors 108a may be installed elsewhere in the duct 106 for a number of purposes including, but not limited, to redundancy of sensors, averaging of values, or integrity monitoring. The duct 106 is connected to a fan system 110 that includes a fan 112, an outlet nozzle 114 connected to the fan outlet and a bypass damper 116 and bypass air plenum 118. The variable-volume exhaust system 100 is monitored and controlled by a controller 120 that receives and processes signals sent from the various sensors, dampers, and other components, as well as sends control signals to such components. A variable frequency drive 122 in communication with the controller 120 controls the speed of the fan 112. The controller 120 may also communicate with a building automation system 124, or may be incorporated into the building automation system 124. An isolation damper 119 can be provided adjacent the fan 112. When the isolation damper 119 is in an open position, the fan 112 is in fluid communication with the bypass plenum 118 and the duct 106. When the isolation damper 119 is in a closed position, fluid communication between the bypass plenum 118 and the fan 112 is blocked thereby isolating the fan from the bypass plenum 118 and the duct 106. Additionally, a sensor 126, such as an air flow or pressure sensor may be located proximate the outlet nozzle 114 to detect airflow conditions.

Figure 2A:
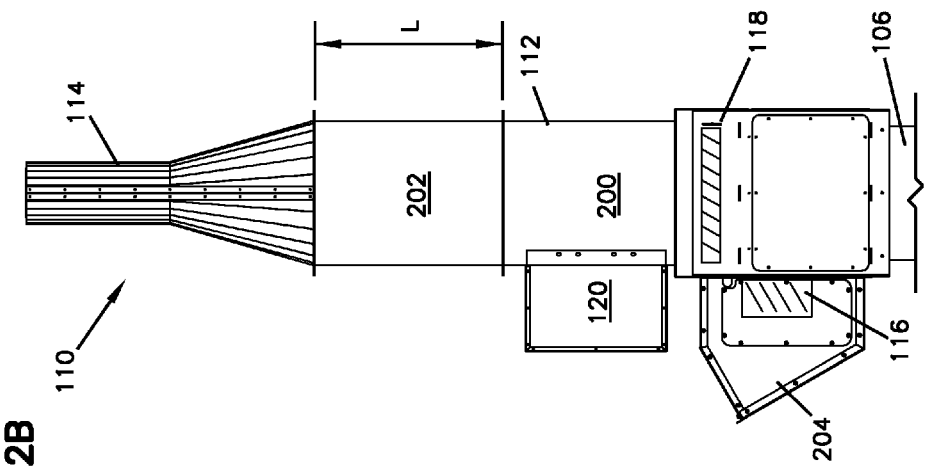
FIGS. 2A and 2B are front and side views, respectively, of a fan system for a variable-volume exhaust system.
Figure 2B:
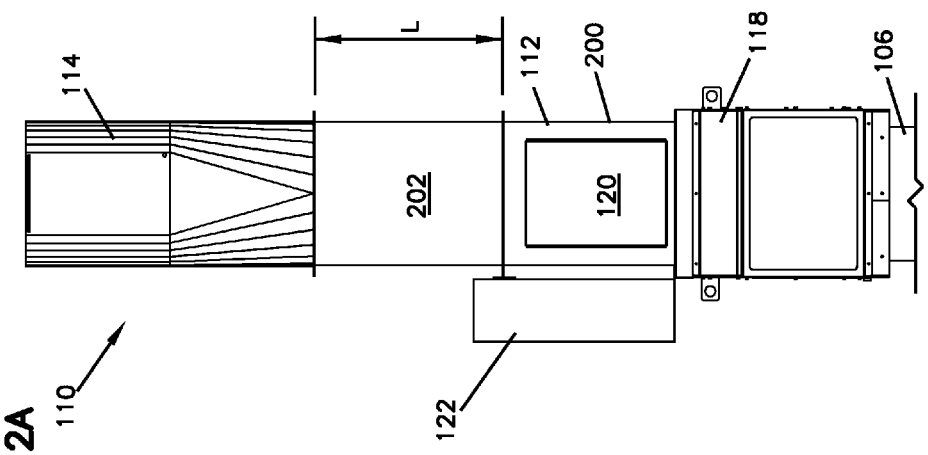

FIGS. 2A and 2B depict a fan system 110 that may be utilized in a variable-volume exhaust system. As described briefly above, the fan system 100 includes fan 112, an outlet nozzle 114 connected to the fan outlet and a bypass damper 116 and bypass air plenum 118. In this embodiment, the fan 112 is an axial fan. In this case, the variable frequency drive 122 is mounted to the fan housing 200. Additionally, the controller 120 may also be secured to or mounted proximate the fan 112. An outlet collar 202 having a length L may also be utilized. The length L may be sufficient to reduce the turbulence of the exhaust air exiting the fan 112, prior to entry into the nozzle 114. The duct 106 may enter the bypass air plenum 118 from below, as depicted, or from the side, through an opening in the bypass plenum 118. The bypass plenum 118 also includes a hood 204 for drawing in bypass air without the introduction of rain, snow, or other moisture, and may include a screen and/or filter to prevent intrusion of debris into the plenum 118. The bypass damper 116 is selectively operable as described below. Of course, the bypass plenum 118 and damper 116 need not be utilized, but the advantages to those components are described below. Additionally, the bypass plenum 118 need not be a component separate from the duct 106 connected to an inlet of the fan 112, but instead may be a length of ductwork onto which the bypass damper 116 and hood 204 are installed. A flow monitoring system, such as a non-invasive flow monitoring system can be installed at the inlet 206 to the fan 112. One such flow monitoring system, which accurately assesses flow output by evaluating the pressure drop across the outlet is the type used in Vektor SureAire™ products sold by Greenheck Fan Corporation of Schofield, Wis. Another representative flow measurement system is described in U.S. Pat. No. 5,586,861, the disclosure of which is hereby incorporated by reference herein in its entirety.

FIGS. 3A and 3B depict another embodiment of a fan system 110a that may be utilized in a variable-volume exhaust system. This fan system 110a includes a radial fan 112a and a variable frequency drive 122. The fan 112a, variable frequency drive 122, motor, controller, and other components may be installed on a skid 300 or other support structure that, like the embodiment depicted in FIGS. 2A and 2B, may be installed on a roof 302, in a mechanical penthouse, or other space. A bypass plenum 118a, including a bypass damper 116 is mounted proximate a side inlet of the fan 112a. The duct 106 from the interior space(s) enters the bypass plenum 118a from below. An isolation damper 119a is positioned between the bypass plenum 118a and the fan 112a. Other alternative duct and damper configurations, such as those described above, are contemplated. The fan 112a outlet is connected to an outlet collar 202, which is, in turn connected to an outlet nozzle 114a. The outlet nozzle 114a has a mechanism 304 for varying the cross-sectional outlet area of the nozzle 114a. A number of mechanisms are described below. A flow monitoring system, such as a non-invasive flow monitoring system (described above) is installed at the inlet 206 to the fan 112.

FIGS. 4A-4D depict top and side views of a variable cross-sectional outlet area nozzle 400. Additional views of this embodiment are depicted in FIGS. 4G-4K. FIGS. 4A and 4B depict the nozzle 400 in a first, minimum cross-sectional area position; FIGS. 4C and 4D depict the nozzle 400 in a second, maximum cross-sectional area position. This nozzle 400 includes a tapered portion 402 connected to an outlet of a fan 112, and a stack portion 404. A damper 406 having a curvature substantially similar to the curvature of the stack outlet is located in the stack 404, and includes, in this embodiment, two translating deflectors 408 connected with a sliding joint 410. An actuator 412 is installed on an outer surface of the stack 404 and is connected to the lower deflector 408 at a pivot 414 or other connection. Upon activation, the actuator 412 rotates the pivot bar 414, which forces the deflector 408 to pitch, such that the upper end of the upper deflector 408 moves closer to a fixed end 416a of the substantially oval discharge outlet 416. A slot 418 and a projection 420 ensure alignment of the upper deflector 408 and, as the upper deflector 408 moves closer to the fixed end 416a, the two deflectors 408 translate relative to each other, with the sliding joint 410 ensuring a proper connection between the two deflectors 408. As the deflectors 408 move closer to the fixed end 416a, the discharge outlet becomes more circular in shape. Actuation of the actuator 412 in the opposite direction returns the deflectors 408 to the original position.

Figure 4E:
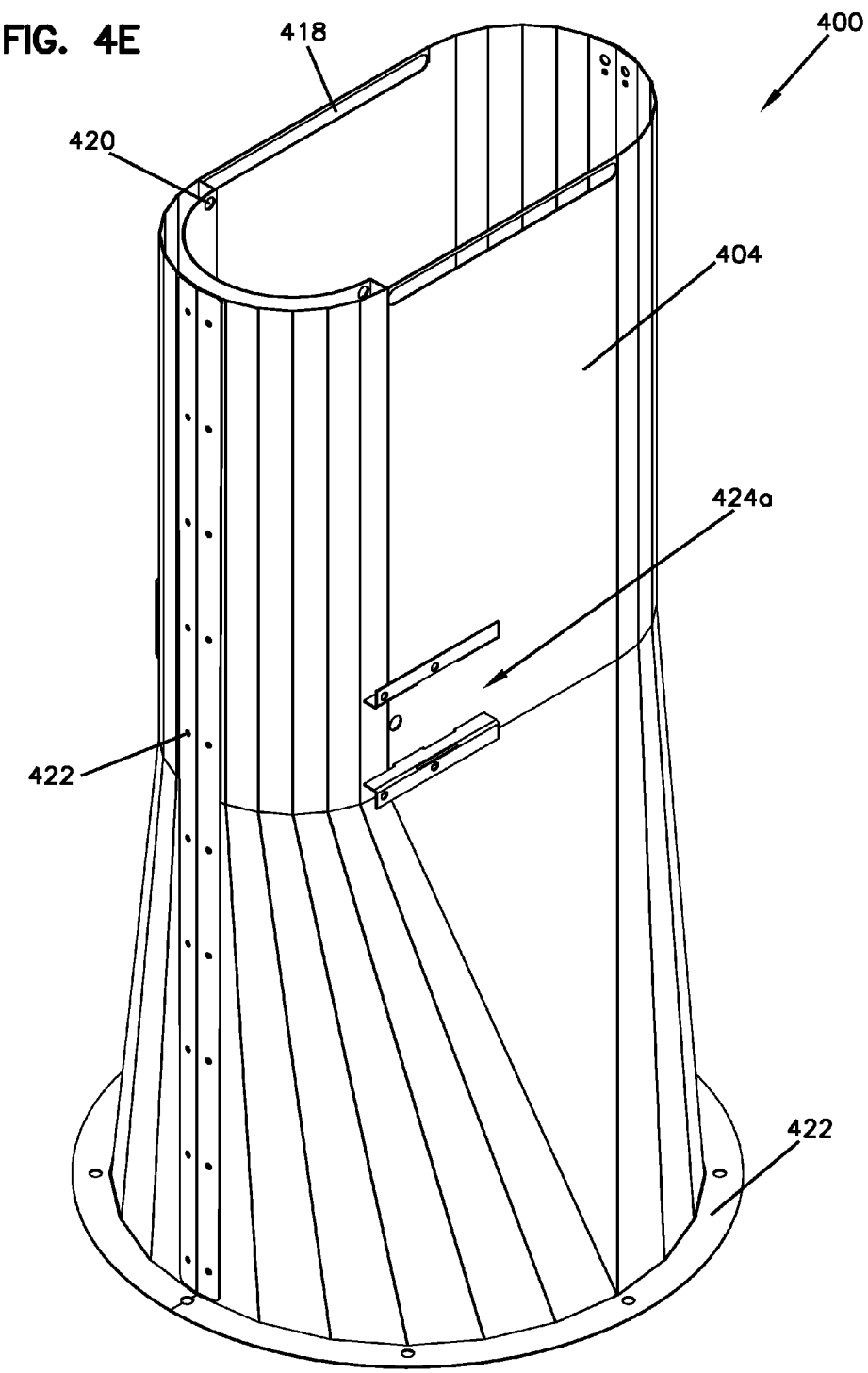

FIGS. 4E and 4F are perspective and exploded perspective views, respectively, of the nozzle 400. Again, the nozzle 400 includes tapered 402 and stack 404 portions. Each of these portions, as well as the deflectors 408 and the various connection elements 422 may be manufactured to sheet metal or other type of material, depending on the desired application. Stainless steel and even high-impact strength plastics may be used for nozzles exhausting air from corrosive environments. The various joints may be joined with the connection elements 422 depicted or may be welded. Joints should be made airtight with sealing elements to prevent leakage of high-velocity, high-pressure air. FIGS. 4E and 4F also depict a number of mounting brackets 424 to which the actuator 412 and other components may be secured. In the depicted embodiment, the actuator 412 is secured to a first actuator bracket 424a. A second actuator bracket 424b may be used to support an opposite end of the pivot bar 414, if the pivot bar 414 extends through the entire stack 404.

Figure 5A:
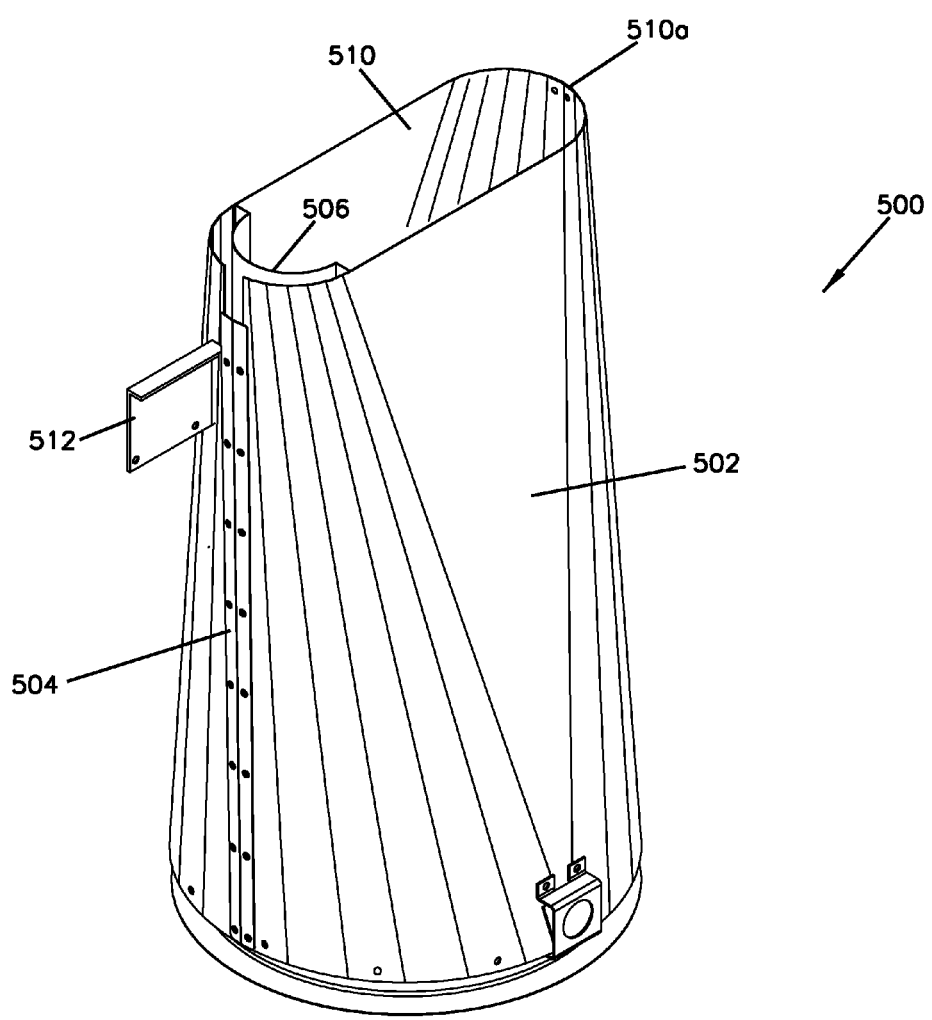
FIGS. 5A and 5B are perspective and exploded perspective views, respectively, of another variable cross-sectional outlet area nozzle.
Figure 5B:
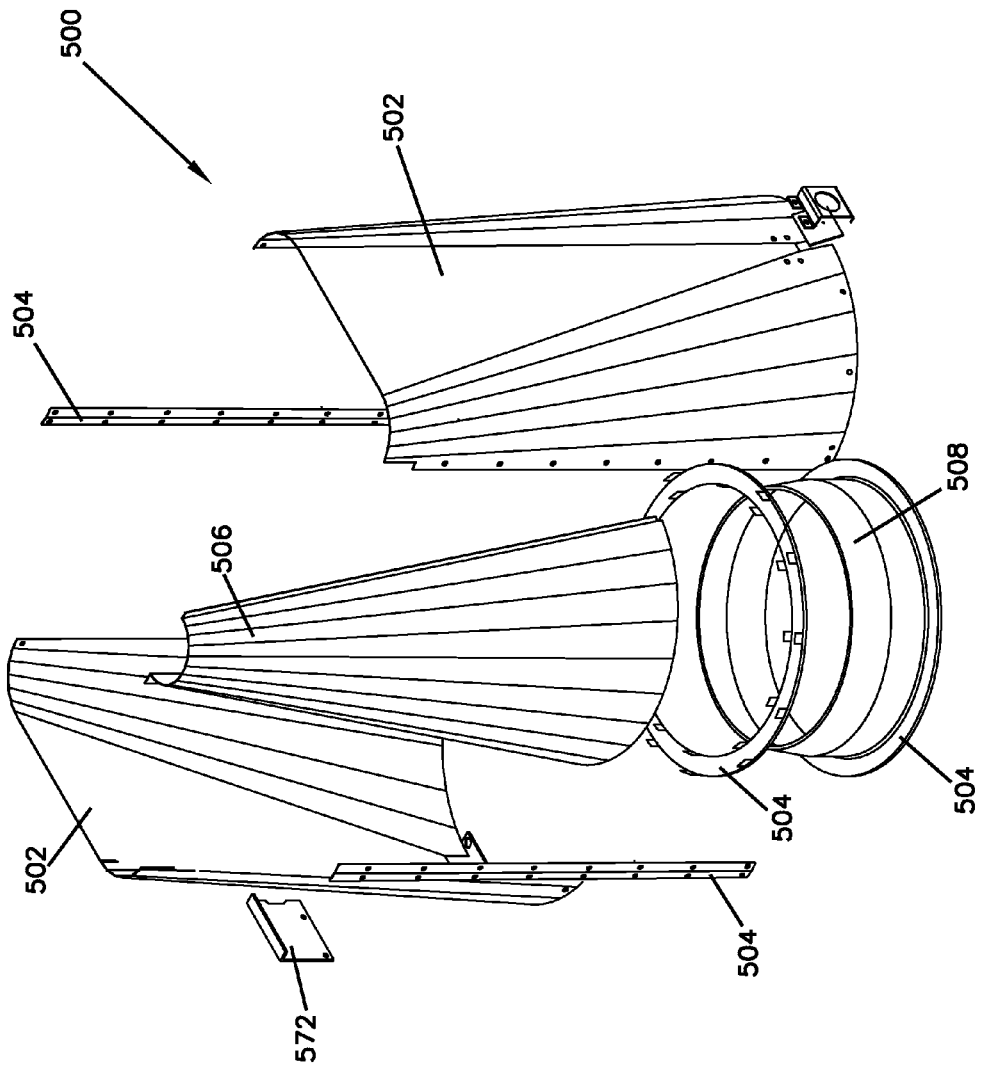

FIGS. 5A-5F depict perspective and exploded perspective views of another embodiment of a variable cross-sectional outlet nozzle 500. The depicted embodiment includes an outer housing 502 and various connection elements 504 that secure the housing 502, though welded connections may also be used. The nozzle 500 includes a positionable damper 506 that is installed within the nozzle housing 502. The damper 506 is moved by an actuator 507 (e.g., a rotary actuator) from a minimum position (with the damper closest to a fixed portion 510a of the opening 510 as shown at FIGS. 5C and 5D) to a maximum position (as depicted in FIG. 5A and FIGS. 5E and 5F). The damper 506 has a concave curvature 509 that faces toward the fixed portion 510a of the opening 510. When the damper 506 is in the maximum position, the opening 510 has an elongate configuration with parallel, opposite sides 511 that extend between concave ends. A pivot axis 513 for the damper 506 is located adjacent a lower end of the outer housing 502. A flexible flap 515 (see FIG. 5C) can extend between a lower end of the damper 506 and the outer housing 502 to prevent exhaust from bypassing the opening 510. Other configurations of the damper 506, collar 508, and housing 502 are contemplated. The nozzle 500 also includes an actuator mounting bracket 512 that is, in this case, installed proximate the damper 506 when the damper 506 is in the maximum position of FIG. 5A. Other locations are contemplated.

Figure 5H:
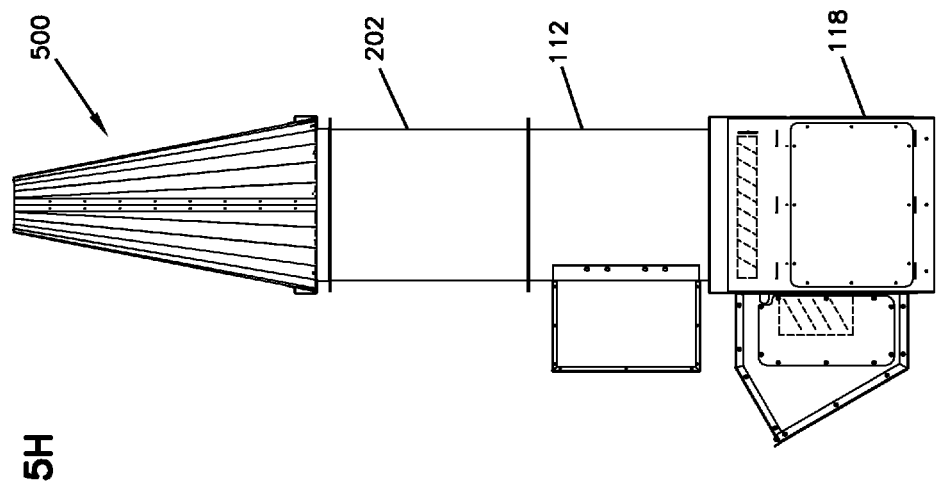
FIGS. 5G and 5H show the nozzle of FIGS. 5A and 5B mounted on an exhaust system.
Figure 5G:
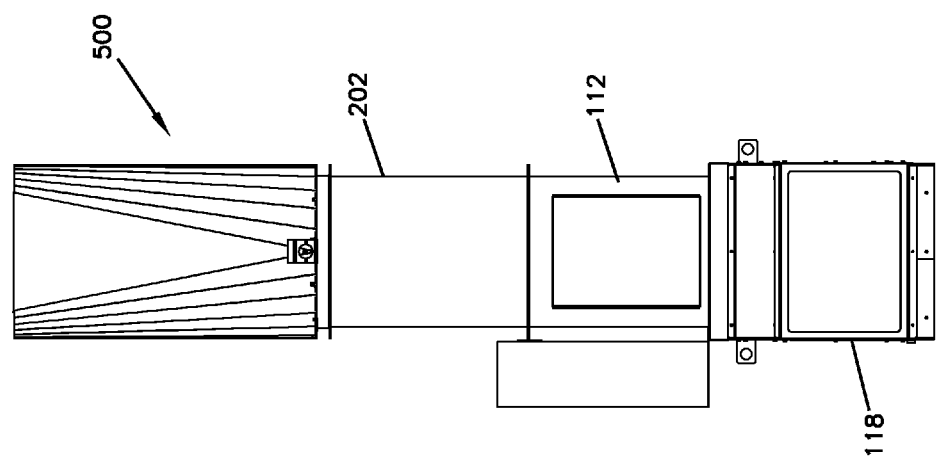
Figure 5J:
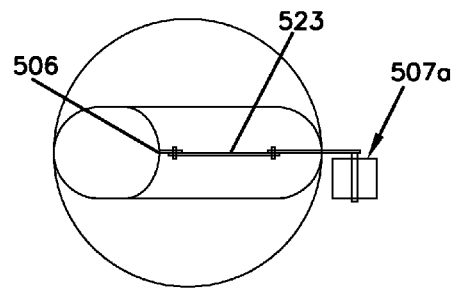
FIGS. 5I-5L show the nozzle of FIGS. 5A and 5B with an alternative rotary actuator connected to the damper with pivotal linkage members.
Figure 5L:
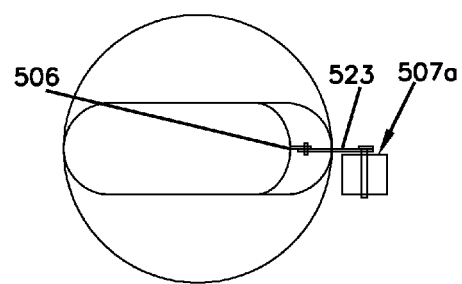
Figure 5I:
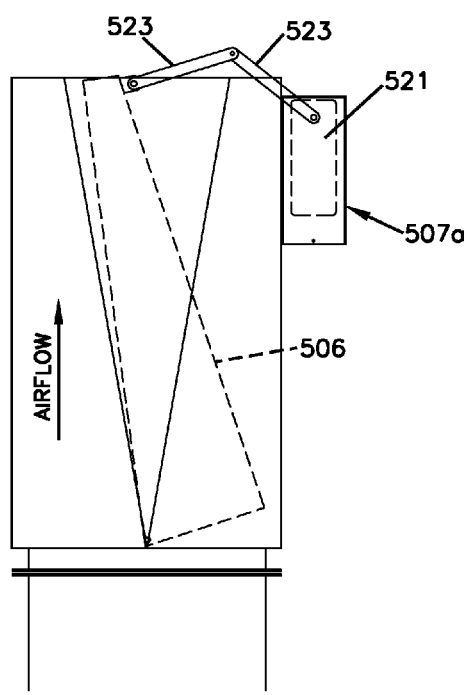
Figure 5K:
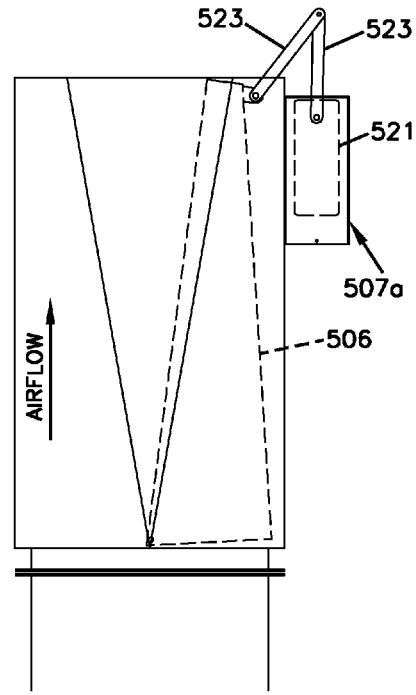

FIGS. 5G and 5H show the nozzle 500 mounted at the discharge end of the exhaust system of FIGS. 2A and 2B. FIGS. 5I-5L show the nozzle 500 equipped with an alternative actuator 507a for moving the damper 506. The actuator 507a includes a rotary drive 521 connected to the damper 506 by pivot linkage members 523. FIGS. 5M-5P show the nozzle 500 equipped with a linear actuator 507b for moving the damper 506 between the maximum transverse cross-section flow area position and the minimum transverse cross-sectional flow area position. A flow monitoring system, such as a non-invasive flow monitoring system (described above) is installed at the inlet to the fan 112.

FIGS. 6A-6D depict top and side views of another embodiment of a variable cross-sectional outlet area nozzle 600. FIGS. 6A and 6B depict the nozzle 600 in a first, minimum cross-sectional area position; FIGS. 6C and 6D depict the nozzle 600 in a second, maximum cross-sectional area position. The nozzle 600 includes a generally square or rectangular housing 602 and is mounted above a fan 112. The nozzle 600 includes a positionable damper 604 that may be moved by a linkage 606 connected to an actuator 608. Other types of linkages may be used with this nozzle 600 or any of the nozzles depicted herein. For example, one or more lead screws may be used to adjust a position of the damper 604. As the linkage 606 pivots the damper 604 from a position located proximate the actuator 608 toward a fixed position 610a, the area of the opening 610 decreases. Other nozzle shapes, configurations, etc. are contemplated.

Figure 7B:
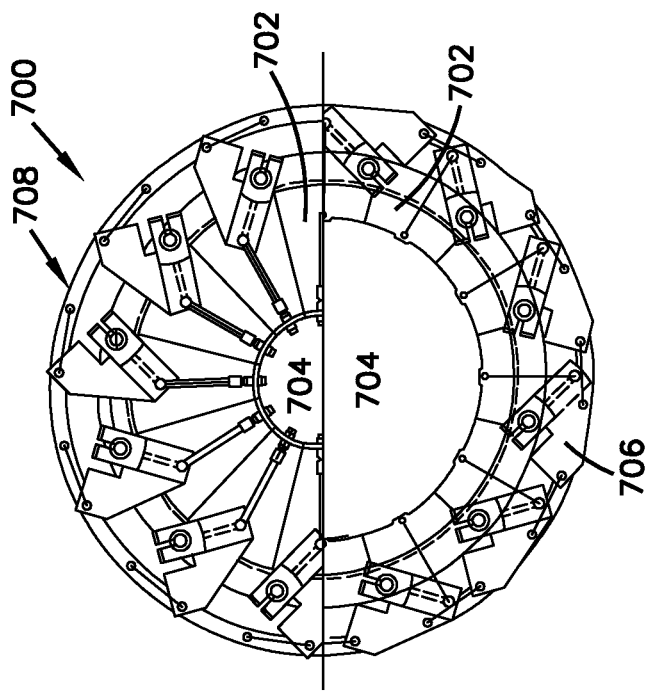
FIGS. 7A and 7B are top and side views of another variable cross-sectional outlet area nozzle.
Figure 7A:
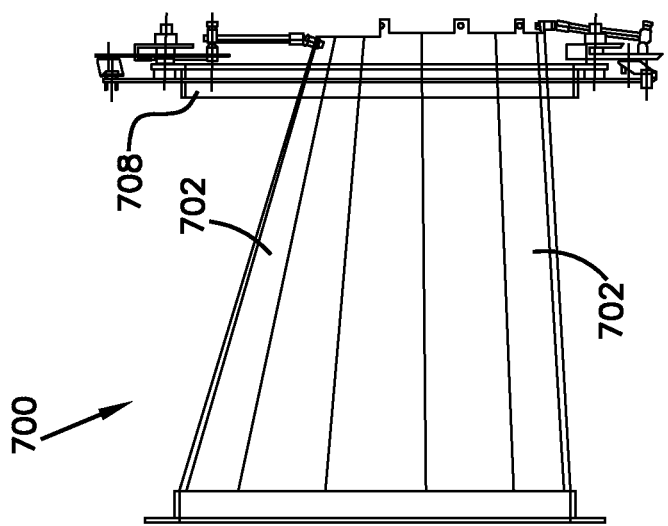

FIGS. 7A and 7B depict top and side views of another embodiment of a variable cross-sectional outlet area nozzle 700. The upper half of each figure depicts the nozzle 700 in a closed or minimum area position; the lower half of each figure depicts the nozzle 700 in an open or maximum area position. The dimensions depicted in FIGS. 7A and 7B are for illustrative purposes only. Embodiments having other dimensions are also contemplated. The nozzle 700 includes a number of overlapping blades 702 that may be moved so as to reduce or increase the area of the outlet 704. Each blade 702 is connected to an actuator 706 supported by an operating ring or collar 708 or other structural member. In one embodiment, the actuator 706 may be a cam or other structure that translates a rotational movement into a linear movement. One or more motors (not shown) rotate or otherwise move the actuators 706 so as to reduce the area of the outlet 704. The blades 702 can have a flexible configuration (e.g., can be made of spring steel or other elastic material or can be mounted via a flexible connection) are biased to flex to an open position where the blades are more upright than the configuration shown at FIGS. 7A and 7B such that the central exhaust passage has a maximum transverse cross-sectional area. By rotating the collar 708, the actuators 706 force the blades to flex radially inwardly about their base ends thereby increasing the amount of overlap and decreasing the transverse cross-sectional area of the central exhaust passage of the nozzle. FIGS. 7A and 7B show the nozzle in a configuration where the cross-sectional area of the central exhaust passage is reduced. In other embodiments, other actuators such as fluid collars (e.g., pneumatic or hydraulic collars) can be used to selectively radially constrict the blades to reduce the transverse cross-sectional area of the nozzle. For example, such collars can be inflated/expanded to reduce the cross-sectional area of the nozzle and can be deflated to increase the cross-sectional area of the nozzle. In still other embodiments, a clamp such as a strap clamp can be used as an actuator. Of course, this nozzle 700 may be installed as the other nozzles depicted above.

FIGS. 8A and 8B depict front and side views, respectively, of another fan system for a variable-volume exhaust system. In general, the fan system of FIGS. 8A-8B is similar to the fan system depicted in FIGS. 2A and 2B, utilizing the same type of fan, variable frequency drive, and bypass plenum 118. More specifically, the fan system 110 of FIGS. 8A and 8B includes fan 112, an outlet nozzle 814 connected to the fan outlet and a bypass damper 116 and bypass air plenum 118. In this embodiment, the fan 112 is an axial fan. In this case, the variable frequency drive 122 is mounted to the fan housing 200. Additionally, the controller 120 may also be secured to or mounted proximate the fan 112. An outlet collar 202 having a length L may also be utilized. The length L may be sufficient to reduce the turbulence of the exhaust air exiting the fan 112, prior to entry into the nozzle 814. The duct 106 may enter the bypass air plenum 118 from below, as depicted, or from the side, through an opening in the bypass plenum 118. The bypass plenum 118 also includes a hood 204 for drawing in bypass air without the introduction of rain, snow, or other moisture, and may include a screen and/or filter to prevent intrusion of debris into the plenum 118. The bypass damper 116 is selectively operable as described below. Of course, the bypass plenum 118 and damper 116 need not be utilized, but the advantages to those components are described below. Additionally, the bypass plenum 118 need not be a component separate from the duct 106 connected to an inlet of the fan 112, but instead may be a length of ductwork onto which the bypass damper 116 and hood 204 are installed. A flow monitoring system, such as a non-invasive flow monitoring system can be installed at the inlet 206 to the fan 112. Exemplary flow monitoring and measurement systems are identified above.

Figure 8C:
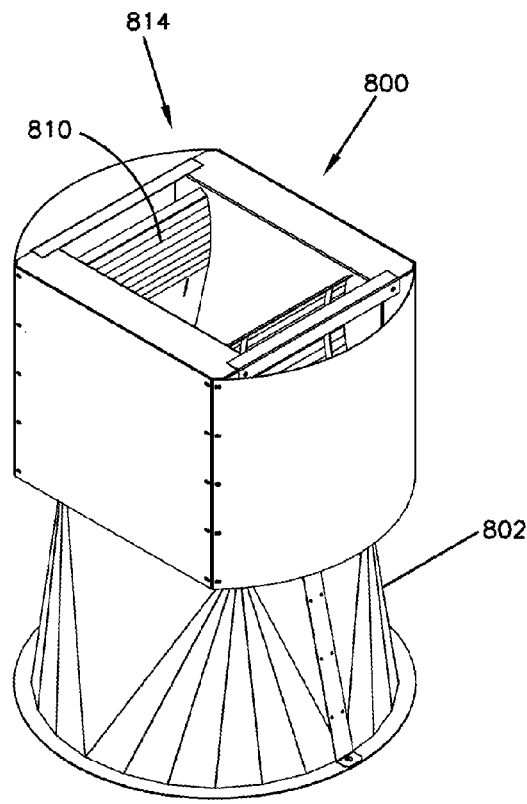
FIGS. 8C-8E are perspective and side views of the nozzle of FIGS. 8A and 8B.
Figure 8D:
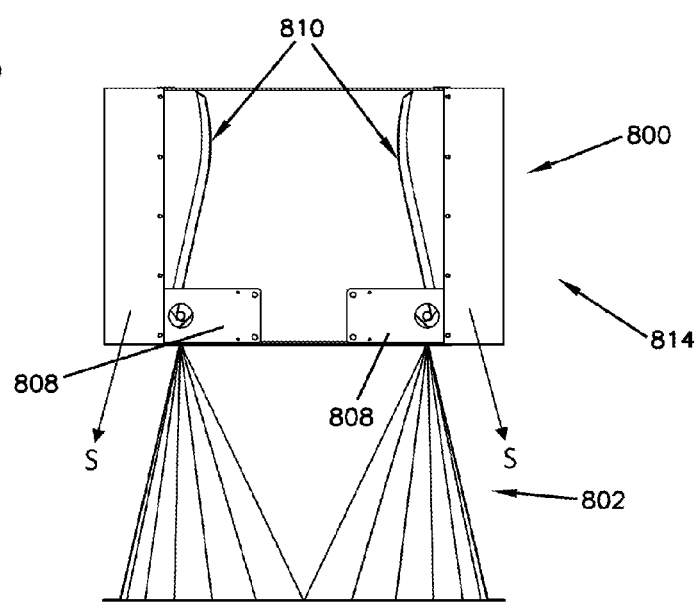
Figure 8E:
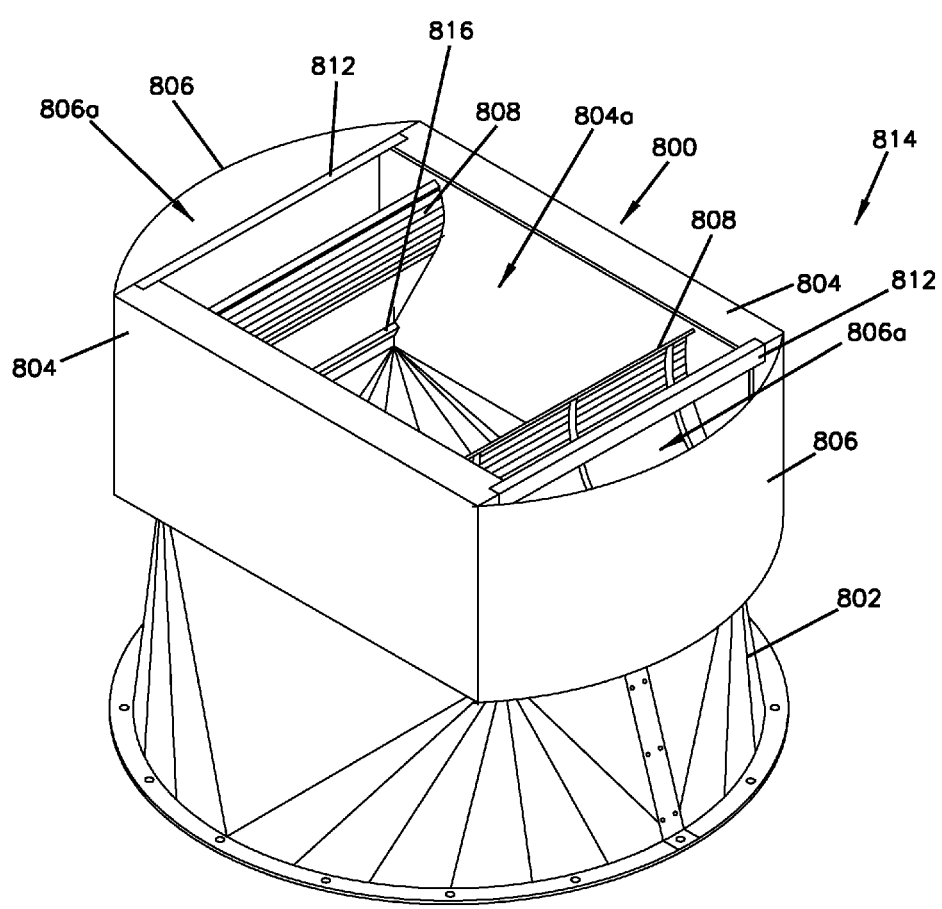
Figure 8F:
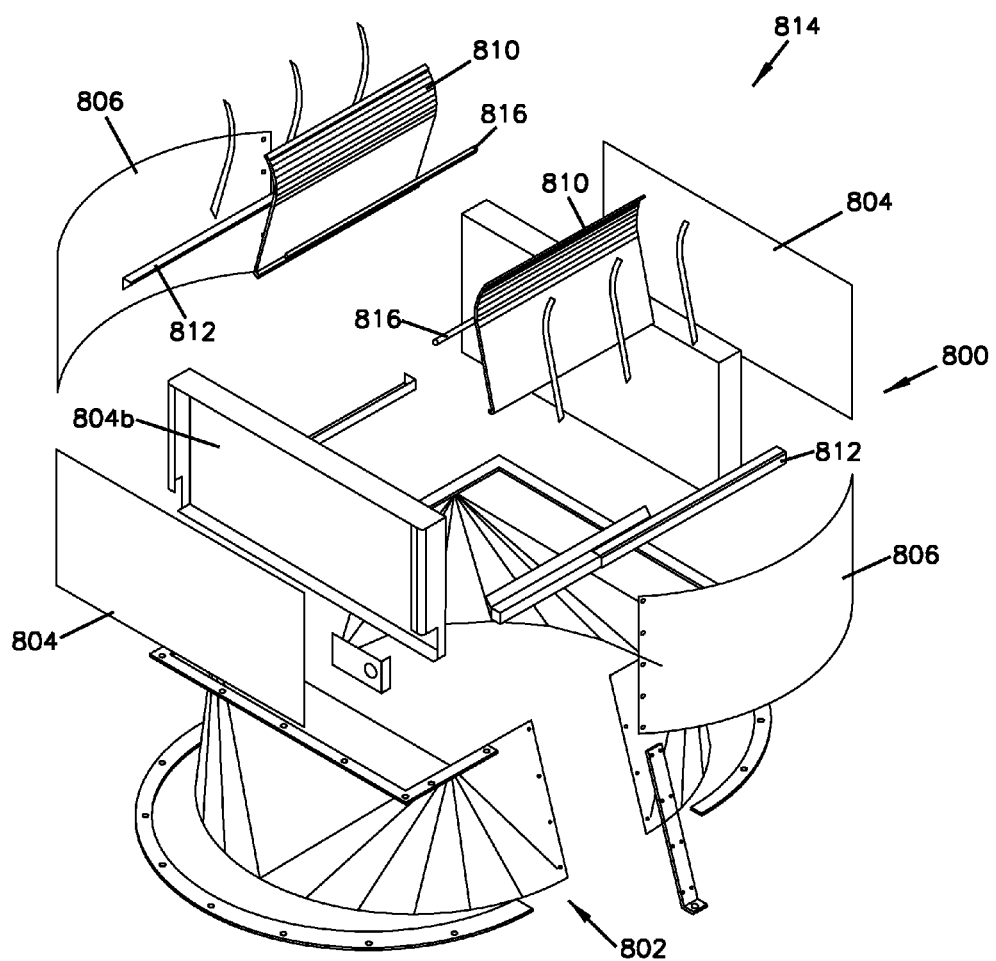
FIG. 8F is an exploded perspective view of the nozzle of FIGS. 8A and 8B.

FIGS. 8C-8E are perspective and side views of the nozzle 814 of FIGS. 8A and 8B. FIG. 8F is an exploded view of the nozzle 814. The nozzle 814 includes a housing 800 that is positioned on a transitional collar 802. The transitional collar 802 connects the substantially rectangular opening on the bottom of the housing 800 to the round outlet collar 202 depicted in FIGS. 8A and 8B. Of course, the transitional collar allows the housing 800 to be connected to an outlet collar 202 having virtually any cross section shape or size. The housing includes side portions 804 and end portions 806 that at least partially defining a discharge area 804a. The side portions 804 are configured to support or protect one or more actuators 808. In the depicted embodiment, the actuators 808 may be installed within a void 804b formed in the side portions 804, thus protecting the actuators 808 from environmental conditions or tampering. The end portions 806 of the housing are bowed outward, thus defining a separation 806a between the end portions 806 and a rear face of the blades 810. The separation 806a allows the blades 810 to shed S water, snow, ice, leaves, or other large or heavy debris that may collect in the discharge area 804a. One or more struts 812 may support the housing 800 proximate the end portions 806.

Returning to FIG. 8D, specifically, the blades 810 and actuators 808 are depicted. The actuators 808 are connected to the controller, described in more detail herein, and move the blades 810 toward or away from each other as dictated by the controller. In the depicted embodiment, the actuators 808 are rotary actuators that pivot each blade 810 at a pivot bar 816 located near the proximal end of the blade 810. In other embodiments, different types and numbers of actuators may be used. For example, linear actuators, or a combination of linear and rotary actuators may be used. Alternatively, a single actuator may be used to control both blades. In another embodiment, one or more secondary actuators may be installed (typically on the opposite end of the pivot bar from the primary actuator) and may be configured to operate the blade if the primary actuator fails. The distal portion of the blade 810 is curved, which helps reduce noise and vibration and also improves air flow. In the depicted embodiment, the lower portion of the blade 810 (approximately two-thirds the length of the blade 810) is straight, while the upper one-third defines a curvature. Other blade configurations and shapes are contemplated, including blades that are straight or curved along their entire length. In certain embodiments, the curvature of the blade may at least partially define a parabolic shape.

FIG. 9 depicts a method 900 of operating a variable-volume exhaust system. The method 900 includes a fan speed adjustment sequence 900a and an outlet area adjustment sequence 900b. With regard to the fan speed adjustment sequence 900a, a desired static pressure is set 902, typically by an operator at a controller. This static pressure is determined via calculations or actual testing such that the fan is able to maintain the correct exhaust flow from the building. This is the static pressure that the fan will attempt to maintain during operation. The duct static pressure is sensed 904 at one or more sensors within the exhaust duct. As described above, if multiple sensors are used, the readings may be averaged or otherwise used to determine an accurate static pressure. The actual measured static pressure is then compared to the set static pressure 906 at the controller. As fume hood dampers close, this creates increasing static pressure in the duct (i.e., the pressure becomes more negative). The pressure transducer communicates this change of pressure to the controller. The controller responds by communicating to the variable frequency drive to reduce the speed of the fan motor 908. In alternative embodiments, where multiple fans are used, the controller may energize one or more fans as required in an effort to maintain the static pressure.

The reduction in fan speed results in a decrease in exhaust air velocity and, in turn, a decrease in duct static pressure (i.e., static pressure becomes less negative). Alternatively, as fume hood dampers open, this creates decreasing static pressure in the duct work (i.e., the pressure becomes less negative). The pressure transducer communicates this change of pressure to the controller. The controller responds by communicating to the variable frequency drive to increase the speed of the fan motor 910. Alternatively or additionally, if the fan is exhaust fan is not energized when the static pressure is sensed, the fan may be energized. The increase in fan speed results in an increase in exhaust air velocity and, in turn, an increase in duct static pressure (i.e., static pressure becomes more negative). The fan speed adjustment sequence 900a described above is used exclusively to control the fan speed (i.e., it operates independent of the outlet area adjustment sequence 900b, described below). Moreover, the fan speed is controlled based solely on the static pressure sensed in the duct, in accordance with the fan speed adjustment sequence. Other similar sequences for other exhaust system configurations are also contemplated.

In the outlet area adjustment sequence 900b, the air flow is first measured 912 via the non-invasive flow monitoring system within the inlet of the fan, which is sent to the controller. The flow-monitoring system (or the controller if signals from the monitoring system are sent directly thereto) may calculate the exhaust air velocity based on a look-up table, algorithm, or other methods. For example, the exhaust air velocity may be calculated based on the output from the sensor and an instantaneous rotational speed of the fan. If the air velocity reading signal is decreasing 914, the controller first determines whether the outlet area of the nozzle may be reduced 916. If so, the controller reduces the outlet area of the variable nozzle 918 to maintain a constant discharge velocity and/or a safe discharge plume height. One particular advantage of the disclosed system relates to the functionality of the bypass damper. For example, if the nozzle is at the minimum free area and unable to reduce further, the controller opens the bypass damper 920. This allows the system to be controlled as a traditional variable volume exhaust system. Returning to step 914, if the air velocity reading is increasing, the controller increases the outlet area of the variable nozzle to maintain a constant discharge velocity and/or a safe discharge plume height. The outlet area adjustment sequence 900b operates independent of the fan speed adjustment sequence 900a and is used exclusively to vary the cross-sectional area of the outlet nozzle, based on exhaust air velocity proximate the nozzle. Moreover, the cross-sectional area of the outlet nozzle is based solely on the exhaust air velocity proximate the nozzle, in accordance with the outlet area adjustment sequence.

Another advantage of the bypass damper is that its position may also be adjusted based on an emergency or need condition. If at any point during operation, should the nozzle, the controller, airflow monitoring system, or other component fail, the bypass damper can be used to control the system as a traditional variable volume exhaust system. In addition to this failure condition, the bypass damper may also be adjusted based on a manual override or other low air flow condition. Additionally, while the fan speed adjustment sequence 900a and the outlet area adjustment sequence 900b are depicted sequentially in a single method 900, these sequences 900a, 900b may operate independently, in parallel. In such parallel operating sequences, the fan speed adjustment sequence 900a may return to step 904 after a decrease or increase of fan speed in steps 908, 910. Similarly, in the outlet area adjustment sequence 900b, after steps 918, 920, and 922 are performed, the sequence 900b may return to measuring airflow at step 912.

Other modifications to the operational method are contemplated. The controller may be used to add or remove fans from operation on multiple fan systems. This is done to rotate stand-by fans through a lead-lag program to equalize run time on all fans including redundant (i.e., stand-by) fans. Multiple fans may also be staged on or off to respond to changes in duct static pressure in conjunction with variable position dampers. For example, decreasing static pressure may require additional fans to satisfy the air velocity and static pressure requirements. Increasing static pressure may allow fans to be de-energized and removed from operation to decrease airflow in conjunction with the variable nozzles. The controller also may incorporate sequences to report information such as fan flow or static pressure to a building automation system via control communication protocol. Additionally, although exhaust air velocity is monitored so as to control the area of the outlet nozzle, other system parameters may be monitors, for example volumetric flow rates (cubic feet/minute, liters/minute, etc.). Additionally, air velocity need not be measured directly. For example, a parameter from one or more sensors indicative of air velocity instead may be utilized.

The embodiment depicted in FIG. 1 describes a laboratory/fume hood exhaust system, but the technology disclosed herein is equally applicable to exhausting air from other spaces, including restrooms, gymnasiums, kitchens, isolation rooms, etc., or any other spaces where specific exhaust settings are required or desired. For example, the technology described above may be utilized in a restroom exhaust system, where multiple restrooms are connected to a single rooftop fan, but where exhaust air is not required at all times. In such a case, the variable speed fan may vary air flow as each restroom is occupied/unoccupied, a condition that may determined based on the position of a light switch, an occupancy sensor, etc. In another embodiment, the static pressure in the duct system may be changed as a remote exhaust fan specific to the particular space (i.e., a fume hood exhaust fan or a restroom exhaust fan) is energized or de-energized. Upon sensing a change in duct static pressure, the fan speed adjustment sequence may operate as described above. Non-noxious spaces utilizing the variable-volume exhaust system described herein typically do not require specific exhaust velocities; accordingly, the outlet area adjustment sequence described above need not be utilized.

Other configurations of fans, ducts, nozzles, and bypass dampers are contemplated. For example, a system fan may be located in a separate mechanical room and may discharge air to a building exterior via a longer duct run. Additionally, the bypass damper may be installed a considerable distance from the fan inlet, though it may be desirable to have the bypass damper installed proximate the fan for service, control, and other reasons. Regardless of configuration, the various dampers, outlets, sensors, etc., described herein, need only be fluidly connected to, or otherwise in fluidic communication with, the fan.

The systems described herein may also be used with multiple constant or variable speed fans to maintain duct static pressure requirements. The embodiment described above that adjusts the speed of a variable-speed fan as spaces become occupied/unoccupied is such an example. A constant speed fan may be associated with one or more spaces. As each space changes between occupied/unoccupied conditions, the associated fan may be energized/de-energized so as to maintain duct static pressure. Additionally, the variable-volume exhaust system described above may also be used to address changes in duct static pressure due to the state of one or more filters located in an exhaust system. As filters entrain more debris, the associated fan may increase its speed to maintain desired exhaust volumes from a space.

The variable-volume exhaust system described above may be sold as a kit, either in a single package or in multiple packages. A kit may include a fan, a variable outlet area nozzle, a variable frequency drive, a controller, a bypass damper, sensors, etc. In other embodiments, the kit may include a variable outlet area nozzle, a controller, a fan, and a bypass damper. In other embodiments, the controller and sensors may be sold in the kit. Other components desired or required for operation of the system may be supplied separately. Each component of the kit includes a plurality of connectors for communication between the various system components. If desired, wiring may be included, although instructions included with the kit may also specific the type of wiring required based on the particular installation. Additional sensor modules and power-generator modules (back-up battery systems, for example) may be available separately or as part of the kit. Additionally, the controller may be loaded with the necessary software or firmware required for use of the system. In alternative configurations, software may be included on various types of storage media (CDs, DVDs, USB drives, etc.) for upload to a standard PC, if the PC is to be used as the controller, or if the PC is used in conjunction with the variable-volume exhaust system as a user or service interface. Additionally, website addresses and passwords may be included in the kit instructions for programs to be downloaded from a website on the internet.

The technology described herein can be realized in hardware, software, or a combination of hardware and software. The technology described herein can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The technology described herein also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

In the embodiments described above, the software may be configured to run on any computer or workstation such as a PC or PC-compatible machine, an Apple Macintosh, a Sun workstation, a dedicated variable-volume exhaust system, etc. In general, any device can be used as long as it is able to perform all of the functions and capabilities described herein. The particular type of computer, workstation, or system is not central to the technology, nor is the configuration, location, or design of a database, which may be flat-file, relational, or object-oriented, and may include one or more physical and/or logical components.

The servers may include a network interface continuously connected to the network, and thus support numerous geographically dispersed users and applications. In a typical implementation, the network interface and the other internal components of the servers intercommunicate over a main bi-directional bus. The main sequence of instructions effectuating the functions of the technology and facilitating interaction among clients, servers and a network, can reside on a mass-storage device (such as a hard disk or optical storage unit) as well as in a main system memory during operation. Execution of these instructions and effectuation of the functions of the technology is accomplished by a central-processing unit ("CPU").

A group of functional modules that control the operation of the CPU and effectuate the operations of the technology as described above can be located in system memory (on the server or on a separate machine, as desired). An operating system directs the execution of low-level, basic system functions such as memory allocation, file management, and operation of mass storage devices. At a higher level, a control block, implemented as a series of stored instructions, responds to client-originated access requests by retrieving the user-specific profile and applying the one or more rules as described above.

Data communication may take place via any media such as standard telephone lines, LAN or WAN links (e.g., T1, T3, 56 kb, X.25), broadband connections (ISDN, Frame Relay, ATM), wireless links, and so on. Preferably, the network can carry TCP/IP protocol communications, and HTTP/HTTPS requests made by the client and the connection between the client and the server can be communicated over such TCP/IP networks. The type of network is not a limitation, however, and any suitable network may be used.

Typical examples of networks that can serve as the communications network include a wireless or wired Ethernet-based intranet, a local or wide-area network (LAN or WAN), and/or the global communications network known as the Internet, which may accommodate many different communications media and protocols.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An exhaust system for exhausting air from a space, the exhaust system comprising:
    a variable-volume exhaust air moving system comprising at least one fan comprising an inlet and an outlet;
    a duct connected to the inlet;
    an outlet nozzle having a variable cross-sectional outlet area, the outlet nozzle fluidly connected to the outlet, wherein the outlet nozzle comprises:
        a housing comprising a plurality of straight side portions and a plurality of curved end portions connecting the straight side portions, wherein the plurality of straight side portions and the plurality of curved end portions connecting the straight side portions define a discharge area; and
        a pair of blades disposed in the discharge area and at least partially defining the variable cross-sectional outlet area, wherein the curved end portions are spaced apart from the blades at both a top and bottom of the blades so as to define a separation, and wherein the separation between the pair of blades and the plurality of curved end portions is configured to allow debris to pass through the separation and out of the exhaust system;
    a selectively operable bypass damper fluidly connected to the inlet;
    a sensor for detecting at least one of a pressure condition and a flow condition in the exhaust system; and
    a control system for controlling the at least one fan, the outlet nozzle, and the bypass damper, based at least in part on a signal sent from the sensor.

2. The exhaust system of claim 1, wherein the sensor comprises a pressure sensor located in the duct;
    wherein the at least one fan comprises a variable speed fan; and
    wherein a speed of the variable speed fan is modulated based at least in part on a signal sent from the sensor to the control system.

3. The exhaust system of claim 1, wherein the sensor comprises a velocity sensor located proximate the outlet nozzle; and
    wherein the control system modulates the cross-sectional outlet area of the outlet nozzle based at least in part on a signal sent from the sensor to the control system.

4. The exhaust system of claim 1, wherein the control system:
    varies a speed of the fan based on a static pressure sensed in the duct;
    varies the cross-sectional outlet area of the outlet nozzle based on an exhaust air velocity proximate the nozzle; and
    selectively operates the bypass damper based on a need condition.

5. The exhaust system of claim 4, wherein the need condition comprises at least one of an override condition, a low air flow condition, and a failure condition.

6. The exhaust system of claim 1, wherein the air moving system further comprises at least one remote exhaust fan for exhausting air from at least one of a room and an exhaust hood to the duct.

7. The exhaust system of claim 1, wherein the outlet nozzle comprises:
    an exhaust riser defining a first cross-sectional area;
    a plurality of dampers positionable within the exhaust riser, wherein a position of the damper defines a second-cross sectional area of the exhaust riser; and at least one actuator for positioning the dampers.

8. The exhaust system of claim 7, wherein the plurality of dampers comprise a first damper and a second damper, and wherein the at least one actuator comprises a first actuator and a second actuator.

* * * * *